United States Patent [19]

Kanematsu et al.

[11] Patent Number: 4,779,204

[45] Date of Patent: Oct. 18, 1988

[54] FEED CONTROL METHOD IN A NUMERICALLY CONTROLLED MACHINE TOOL

[75] Inventors: Hiroyuki Kanematsu, Konan; Kazuki Uemura, Nagoya; Koji Matsumoto, Gifu; Yuji Sano, Hashima, all of Japan

[73] Assignee: Yamazaki Machinery Works, Ltd., Niwa, Japan

[21] Appl. No.: 887,624

[22] Filed: Jul. 21, 1986

[30] Foreign Application Priority Data

Jul. 22, 1985 [JP] Japan .................. 60-161373

[51] Int. Cl.$^4$ .................. G06F 15/46; B23B 47/34
[52] U.S. Cl. .................. 364/474.32; 364/167.01; 318/571; 408/3; 408/10; 408/17

[58] Field of Search ............. 364/167, 170, 474, 475; 318/571; 408/10, 11, 12, 3, 17; 409/80

[56] References Cited

U.S. PATENT DOCUMENTS 4,604,705 8/1986 Imanishi .................. 364/474

Primary Examiner—John R. Lastova
Attorney, Agent, or Firm—Cushman, Darby & Cushman

[57] ABSTRACT

A tool or a workpiece is fed by the cut feed by cut feed commands during periods when the tool or the workpiece would normally be fed by rapid feed. These periods are chosen to occur when the distance of the sections to be fed is a predetermined distance or less. Then, in the case that the feeding distance is the predetermined distance or less, the tool or the workpiece can be fed more rapidly by cut feed rather than rapid feed. Thus, machining time is shortened to that extent.

4 Claims, 7 Drawing Sheets

FIG. 3

|  | MAX. FEED SPEED | ACCELERATION/ DECELERATION | RISE/ BREAK-ING TIME | ERROR DETECTION CONTROL |
|---|---|---|---|---|
| RAPID FEED (G00) | MAX. OF MECHANI-CAL MOVE SYSTEM | EXPONETIAL OR LINEAR ACCERATION/ DECELERATION | LARGE | SELDOM USED |
| CUT FEED (G01) | ABT. ONE HALF OF USUAL RA-PID FEED | GENERALLY LINEAR ACCELERATION/ DECELERATION | SMALL | USED |

FIG. 7

```
              PRO
               ↓
         G 94   G 90   G 00   Z   -50
   JS1 ──── G 91 → G 01   Z   -20   F  100
         FS1 ────→ G 00   Z     2
   JS2 ────────→ G 01   Z   -22
         FS2 ────→ G 00   Z     2
   JS3 ────────→ G 01   Z   -22
         FS3 ────→ G 00   Z     2
   JS4 ────────→ G 01   Z   -22
         FS4 ────→ G 00   Z     2
   JS5 ────────→ G 01   Z   -22
              G 90   G 00   Z     0
```

FEED CONTROL METHOD IN A NUMERICALLY CONTROLLED MACHINE TOOL

BACKGROUND OF THE INVENTION

This invention relates to a feed control method in a numerically controlled machine tool wherein, when a distance for a rapid feed is less than a predetermined value, a tool or a workpiece being fed is fed by cut feed in order to shorten machining time.

Heretofore, when a machining operation is commanded in a numerically controlled machine tool by a machining program having a section for effecting a cut feed and a section for effecting a rapid feed which are presented in turn, the cut feed and the rapid feed are effected in turn according to the commands of the machining program as a matter of course. However, in a recent machine tool, development has been made in the direction of shortening machining time as much as possible, and there has been a demand for development of such a system which is able to control a feeding so as to shorten total machining time as long as it does not interfere with a machining operation.

SUMMARY OF THE INVENTION

The present invention was accomplished in view of the above situation. It is, therefore, a general object of the present invention to provide a feed control method in a numerically controlled machine tool wherein a total machining time can be shortened.

That is, the present invention is based on the finding that a tool or a workpiece can be fed more rapidly by cut feed than rapid feed if it is within a range of a certain distance. In the case that a cut feed is commanded in a first step of a machining program, a rapid speed feed is commanded in the succeeding second step thereof and a cut feed is commanded once again in a further succeeding third step thereof. In the case that a moving amount in the second step is within a range of a distance in which a tool or a workpiece can be fed more rapidly by cut feed than rapid feed, the feed in the second step is effected by cut feed.

Thus, according to the present invention, in the case it is judged that a tool or a workpiece can be fed more rapidly by cut feed than rapid feed, the tool or the workpiece is fed by cut feed. Accordingly, the present invention has the advantage that total machining time is shortened to that extent.

BRIEF DESCRIPTION OF THE DRAWINGS

FIG. 3 is an illustration for comparing operation modes of a rapid feed and a cut feed in detail;

FIG. 7 is an illustration showing the machining content of FIG. 6 in the form of a machining program; and FIG. 8 is an illustration showing a machining content actually performed in the form of a machining program according to the machining program of FIG. 7.

DESCRIPTION OF THE PREFERRED EMBODIMENTS

Figure 1:
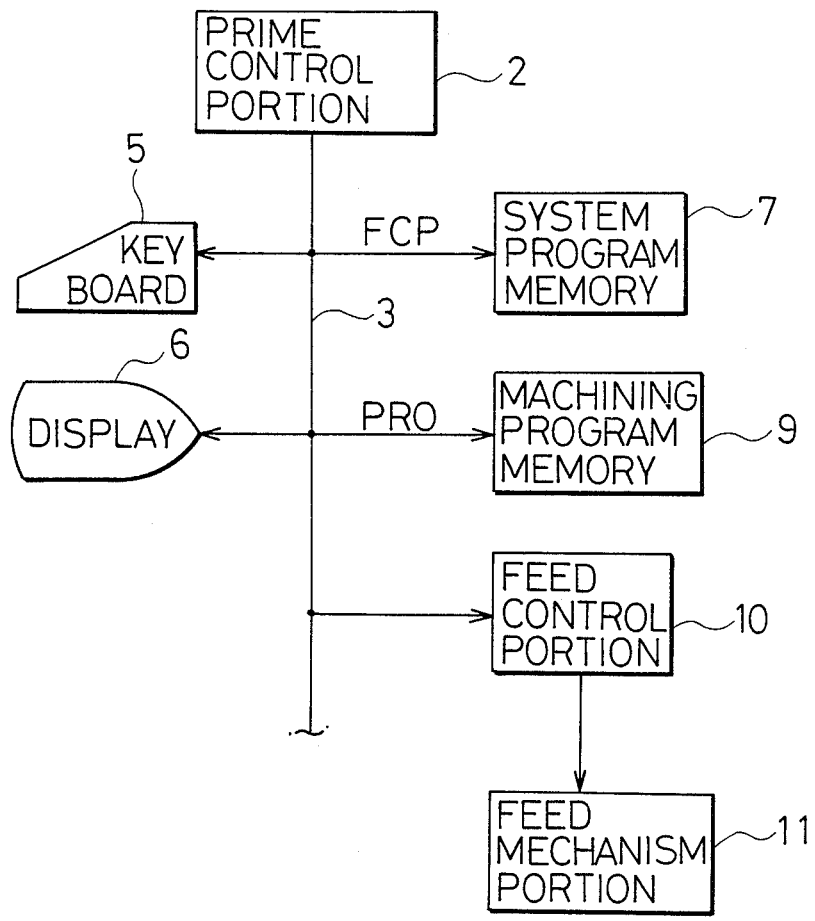
FIG. 1 is a control block diagram showing one example of a numerically controlled machine tool to which the present invention is applied.

A numerically controlled machine tool 1, as shown in FIG. 1, includes a prime control portion 2. The prime control portion 2 is connected with a key board 5, a display 6, a system program memory 7, a machining program ememory 9 and a feed control portion 10 through a bus line 3. The feed control portion 10 is also connected to a feed mechanism portion 11.

Next, FIG. 3 illustrates the detailed operation mode of a rapid feed and a cut feed effected in a usual numerically controlled machine tool including the numerically controlled machine tool 1 of FIG. 1. That is, as is apparent from FIG. 3, the maximum feed speed, in the case of a rapid feed ("G00" in EIA/ISO code, hereinafter indicated by merely G??, where ?? represents figures, represents an indication of EIA/ISO code), is a maximum value of a mechanical transfer system, and in the case of a cut feed (G01), is approximately one half of the rapid feed. The rise time (time constant) thereof is large in the rapid feed and small in the cut feed. Further, an error detection control (control for performing the next command before completion of positioning based on the present command) in the case of the rapid feed is seldom used because of lack of necessity, although it is mechanically usable, and in the case of the cut feed, it is frequently used.

Figure 4:
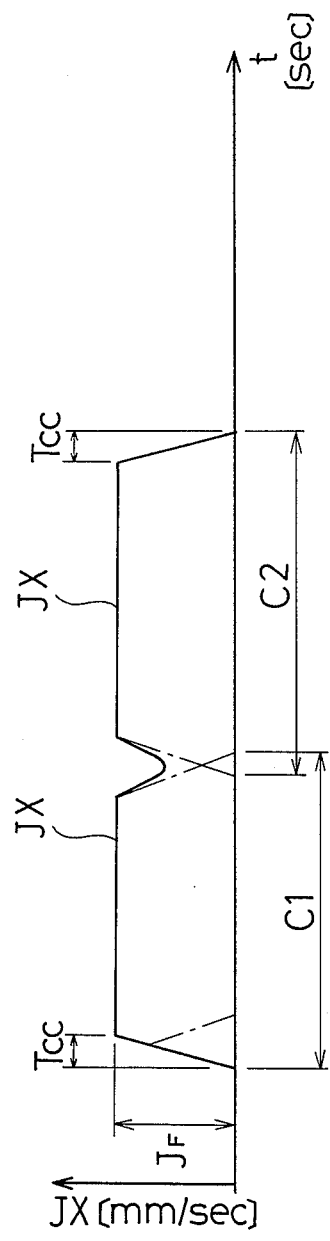
FIG. 4 is a time chart showing a feed speed of a cut feed.
Figure 5:
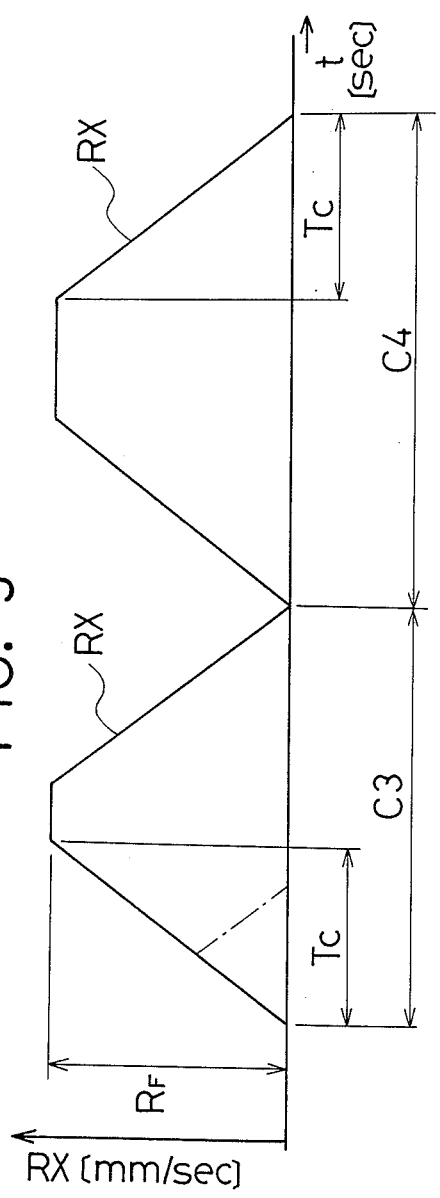
FIG. 5 is a time chart showing a feed speed of a rapid feed.

Next, FIG. 4 illustrates a time chart of a feed speed at the time when feed cut commands are issued in a consecutive manner, while FIG. 5 illustrates a time chart of a feed speed at the time when rapid feed commands are issued in a consecutive manner. As apparent from the illustration, in the case that cut feed commands are issued in a consecutive manner, immediately before completion of positioning of a tool (although there will be described hereinafter a feed control on a tool, the present invention is not limited to a feed control of a tool, for it is likewise applicable to a feed control of a workpiece) in a predetermined position by running a command C1, a next following command is run (error detection control). As a result, a cut feed speed JX in maintained, which is other than zero, from the command C1 to a command C2. At this time, a rise time constant $T_{cc}$ of the feed speed JX is approximately 0 to 10 [ms]. On the other hand, in the case that rapid commands C3 and C4 are issued in a consecutive manner, the error detection control is not effected. Instead, after a tool is positioned according to a command C3, the tool is positioned according to a command C4. Accordingly, a rapid feed speed RX temporarily becomes zero at the time point when it runs the command C3 and thereafter the command C4 is run. At this time, the time constant $T_c$ of the rapid feed speed RX is approximately 100 to 150 [ms].

Let us review here how much actual feed action is made in distance for time t seconds from the start of a feed action in case of a rapid feed, and a cut feed respectively. In the respective feed actions, an area enclosed with a speed curve line and a time axis shown in FIGS. 4 and 5 is a feed amount, i.e., a distance in which the feed action was effected.

First, let us review a case of a rapid feed. As apparent from FIG. 5, in the case that time t is $t > 2T_c$, that is, in the case that the feed speed RX reaches a predetermined rapid feed speed $R_F$, a transfer distance $RS_L$ is achieved by rapid feed which is equal to:

$$RS_L = R_F \cdot T_C + R_F(t - 2T_C) \quad (1)$$
$$= R_F(t - T_C)$$

Further, in the case of $0 \leq t \leq 2T_C$, i.e., when the rapid speed is reduced in speed midway as shown by the one dotted line of FIG. 5 without reaching the predetermined rapid feed speed $R_F$, a transfer distance $RS_S$ by rapid feed is equal to:

$$RS_S = \frac{1}{2} R_F \cdot \frac{t}{2T_C} t \quad (2)$$
$$= \frac{R_F \cdot t^2}{4T_C}$$

On the other hand, in the case of a cut feed, in FIG. 4, in the case of $t > 2T_{CC}$, i.e., in the case a feed speed JX reaches a predetermined cut feed speed $J_F$, the transfer distance $JS_L$ achieved by cut feed is:

$$JS_L = J_F(t - T_{CC}) \quad (3)$$

Further, in the case of $0 \leq t \leq 2T_{CC}$, i.e., as shown by the one dotted line of FIG. 4, when the feed speed JX does not reach the predetermined cut feed speed $J_F$, a transfer distance $JS_S$ achieved by cut feed is:

$$JS_S = \frac{J_F \cdot t^2}{4T_{CC}} \quad (4)$$

Since $T_{CC} < T_C$, the following relations are obtained from formulas (1) through (4):

In the case of $0 \leq t \leq 2T_{CC}$ $$RS_S = R_F \cdot t^2 / 4T_C \quad (5)$$

$$JS_S = J_F \cdot t^2 / 4T_{CC} \quad (5)$$

In the case of $2T_{CC} < t < 2T_C$ $$RS_S = R_F \cdot t^2 / 4T_C \quad (6)$$

$$JS_L = J_F(t - T_{CC}) \quad (6)$$

In the case of $2T_C < t$ $$RS_L = R_F(t - T_C) \quad (7)$$

$$JS_L = J_F(t - T_{CC}) \quad (7)$$

If conditions for satisfying $JS \geq RS$, i.e., conditions in which the transfer distance by cut feed exceeds the transfer distance by rapid feed, are sought for the respective cases from the formulas (5) through (7), conditions for satisfying $JS_S \geq RS_S$ in the case of $0 \leq t \leq 2T_{CC}$ are obtained from the formula (5) as follows:

$$J_F / T_{CC} \geq R_F / T_C \quad (8)$$

Conditions for satisfying $JS_L \geq RS_S$ in the case of $2T_{CC} < t \leq 2T_C$ are obtained from the formula (6) as follows:

$$J_F(t - T_{CC}) \geq R_F \cdot t^2 / 4T_C$$

$$\therefore R_F t^2 - 4T_C J_F t + 4T_C \cdot T_{CC} \cdot J_F \leq 0$$

If t is sought from the above relation:

$$\frac{2T_C \cdot J_F - \sqrt{4T_C \cdot J_F(T_C \cdot J_F - T_{CC} \cdot R_F)}}{R_F} \leq t \leq 0 \quad (9)$$

$$\frac{2T_C \cdot J_F + \sqrt{4T_C \cdot J_F(T_C \cdot J_F - T_{CC} \cdot R_F)}}{R_F}$$

Conditions for satisfying $JS_L \geq RS_L$ in the case of $2T_C \leq t$ may be sought from the formula (7) as follows:

$$J_F(t - T_{CC}) \geq R_F(t - T_C)$$

$$(J_F - R_F) t \geq J_F T_{CC} - R_F T_C$$

Since $(J_F - R_F) < 0$, the following relation is obtained:

$$t \leq \frac{J_F \cdot T_{CC} - R_F \cdot T_C}{J_F - R_F} \quad (10)$$

If the following relations are given here:

$J_F = 6$ [m/min] = 100 [mm/sec]

$T_{CC} = 10$ [ms] = 0.01 [sec]

$R_F = 12$ [m/min] = 200 [mm/sec]

$T_C = 100$ [ms] = 0.1 [sec]

the formula (8) is always established. Accordingly, a tool can be fed more rapidly if fed by cut feed than rapid feed within the range of $0 \leq t \leq 0.02$ [sec].

Likewise, in the range of 0.02 [sec] $\leq t \leq 0.2$ [sec], it is known from the formula (9) that a tool can be fed more rapidly if fed by cut feed rather than rapid feed within the range of 0.02 [sec] $< t \leq 0.1894$ [sec]. At this time, a transfer distance of the tool by cut feed is shown by the following formula from the formula (6):

$$JS_L = J_F(t - T_{CC}) = 17.94 \text{ [mm]} \quad (11)$$

Thus, it is known that the tool can be fed more rapidly if fed by cut feed rather than rapid feed for a distance of 17.94 [mm] or less.

Also, in the case of 0.2 [sec] $\leq t$, a value obtained from the formula (10) becomes $t \leq 0.19$. Since this does not satisfy the preassumed condition, the tool can be fed more rapidly by rapid feed than cut feed in the case that a rapid feed is effected for 0.2 seconds or more.

The above can be summarized as follows. In the case that a feed distance is 17.94 [mm] or less, a tool can be fed more rapidly by cut feed than rapid feed.

Figure 6:
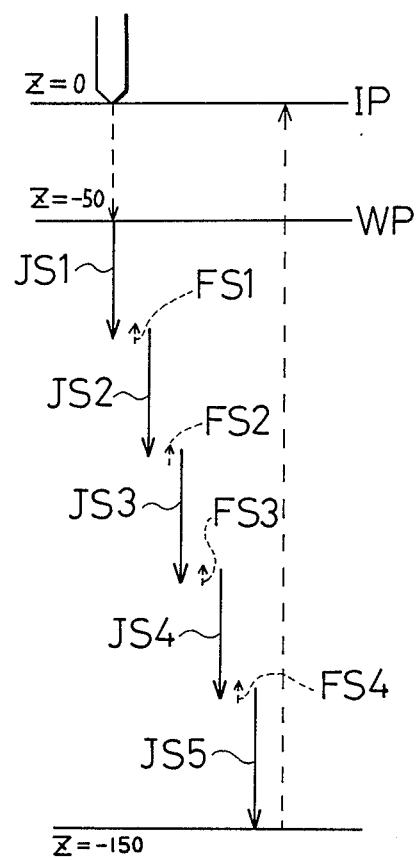
FIG. 6 is an illustration showing a tool feed mode in a drill machining process.

There will be described hereunder a case in which a drill machining process shown in FIG. 6 is effected by the numerically controlled machine tool 1 shown in FIG. 1.

The drill machining process shown in FIG. 6 is effected in such a manner that a tool is fed by rapid feed (feed speed is 10 [m/min]) from an initial position IP of $Z = 0$ to a machining start position WP of $Z = -50$, and thereafter a cut machining by drill is effected in the $-Z$ direction by cut feed (feed speed is 100 [mm/min]) per every 20 to 22 dimension units, whereas when a cut machining of 20 to 22 dimension units is effected, the tool is fed back by 2 dimension units in the +Z direction by rapid feed (feed speed is 10 [m/min]). This action is the so-called pecking action.

Figure 2:
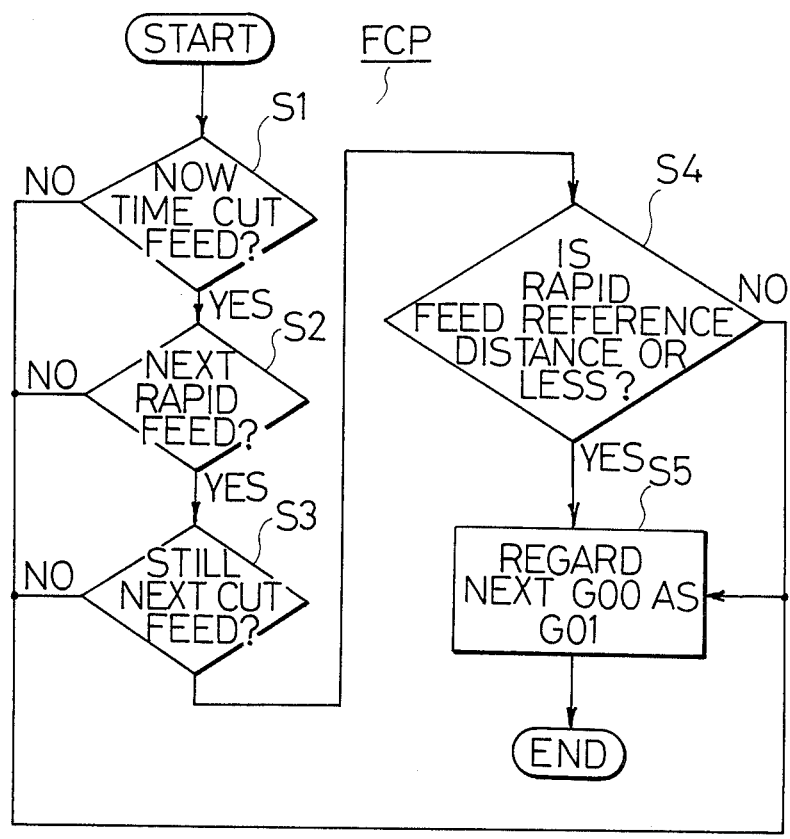
FIG. 2 is a flow chart showing one example of a feed control program.

In this case, a machining program PRO is prepared in the form as shown in FIG. 7 and is stored in the machining program memory 9. The prime control portion 2 reads out the machining program PRO from the machining program memory 9 and actuates the feed control portion 10 to perform the aforementioned drill machining. At this time, the prime control portion 2 reads out a feed control program FCP from the system program memory 7 and controls a feed action in the machining based on the machining program PRO. That is, the feed control program FCP, as shown in FIG. 2, judges in step S1 whether a step of the machining program PRO now being run is a step by cut feed and also judges in step S2 whether the next step of the machining program PRO commands a rapid feed. In step S2, if it was judged that the next step of the machining program PRO commands a rapid feed, control goes to step S3 where it is judged whether the succeeding step of the step in which a rapid feed is commanded commands a cut feed. That is, from step S1 to step S3, judgment is made on whether a rapid feed command is commanded during the machining steps of a cut feed. The reason why the foregoing is effected is that if a rapid feed command is not issued during the cut feed commands, there can be hardly expected a shortening of transfer time in the usual case even if a tool is fed by cut feed for the portion of a rapid feed. A case in which a shortening of transfer time can be expected is that as shown by the formulas (8), (9), (10) and (11) where the transfer distance is short. Accordingly, even if rapid feed commands are issued in a consecutive manner, it is effective only in the case that the transfer distance is short. However, such a happening would be quite rare.

In this way, when it is judged that a rapid feed command is issued while in the cut feed machining steps, control goes into step S4. In step S4, it is judged whether the transfer distance by rapid feed is less than a predetermined distance (for example, 17.94 [mm] shown by the formula (11)) in which a tool can be fed more rapidly by cut feed than rapid feed, and when it is judged to be less than the predetermined distance, the following rapid feed command, i.e., the G00 command is regarded as the cut feed command G01 (step 5). The prime control portion 2 then instructs the feed control portion 10 to keep transferring the tool by cut feed. At this time, it is preferable to feed the tool at the maximum speed of cut feed so that maximum advantage of a shortened machining time can be produced.

Figure 8:
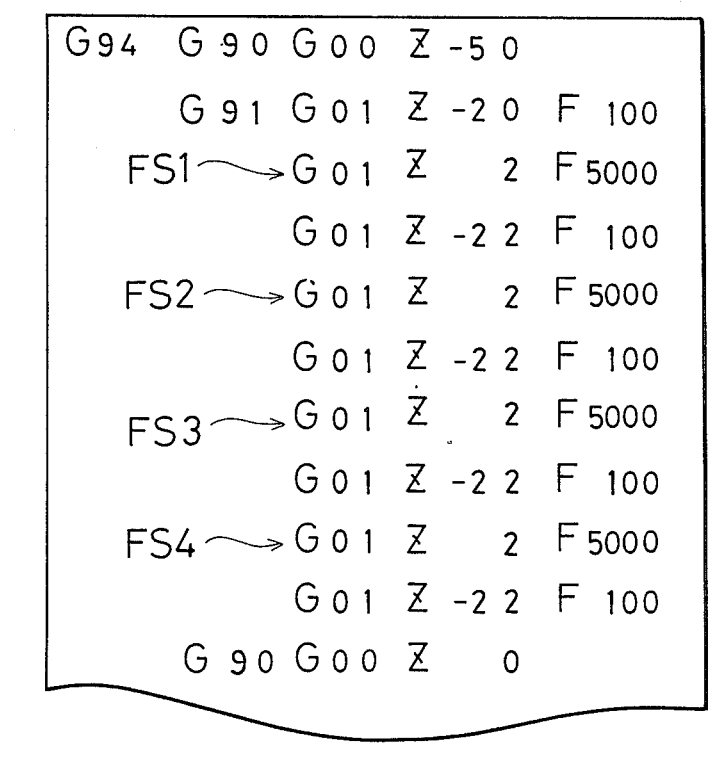

FIG. 8 illustrates the result achieved by feed control program FCP at the time when the machining program PRO shown in FIG. 7 is run in the form of the machining program. As apparent from the illustration, the rapid feed steps FS1 through FS4 of FIG. 7 are all revised to a feed speed F5000, i.e., 5000 [mm/sec] of cut feed and run in FIG. 8. A test was carried out in order to obtain a machining time in the case that the machining program PRO of FIG. 7 was not revised at all. The result was 67.8 seconds. The machining time according to the revised program of FIG. 8, on the other hand, was 67.5 seconds. Further, the aforementioned error detection control was effected between the respective commands of cut feed. As a result, the machining time was shortened to 67.2 seconds.

In the above embodiments, there has been described a case in which a rapid feed command in a machining program is revised to a cut feed command. However, the present invention is not limited to the above case. Instead, it is of course applicable to a case in which the present invention is constituted such that portions where rapid feed commands are originally issued are revised to cut feed commands and a sub-routine or sub-program (fixed cycle) is prepared in such revised form beforehand to shorten the machining time.

For example, in a fixed cycle such as an end face cutting-off cycle of G 74, an outside diameter cutting-off cycle of G75, a deep hole drilling cycle of G86, etc., by EIA/ISO code, a tool is transferred for a fixed distance, for example, in the minus direction by cut, feed to cut and thereafter is transferred for a predetermined distance in the reverse direction by rapid feed thereby to treat chips produced immediately before. Further, a cutting action is effected in the minus direction. That is, in a fixed cycle for effecting the so-called pecking action, since a return distance by rapid feed is usually extremely short, the total machining time is often shortened if the tools are kept transferred in the reverse direction by cut feed. Accordingly, the feeding in a fixed cycle commanded as a subroutine or sub-program in a machining program can be commanded in such a manner that a process to be fed by rapid feeding is fed by usual cut feed already in the state for preparing the fixed cycle (manufacturing time of a machine tool).

Although the present invention has been described with reference to the preferred embodiment, the embodiment described herein is for illustrative purposes only and not in limitation thereof. Also, the scope of the present invention is defined in the appended claims and will not be binded by description of the embodiment. Accordingly, it will be understood that all changes and modifications which belong to the appended claims fall within the true spirit and scope of the present invention.

What is claimed is:

1. A feed control method for a numerically controlled machine tool responsive to a series of feed control commands, comprising the steps of:

determining whether the present feed control command is a cut feed command;

when the present feed control command is a cut feed command, determining whether the next feed control command is a rapid feed command;

when the present feed control command is a cut feed command and the next feed control command is a rapid feed command, determining whether the command after said next feed control command is a cut feed command;

when the command after said next feed control command is a cut feed command, determining whether a transfer distance of a rapid feed controlled by said rapid feed command is less than a predetermined distance at which said machine tool can be fed more rapidly by cut feed than rapid feed; and when said transfer distance by rapid feed is less than said predetermined distance at which said machine tool can be fed more rapidly by cut feed than rapid feed, transferring said tool by cut feed rather than by rapid feed in response to said rapid feed command.

2. A feed control method for a numerically controlled machine tool responsive to a series of feed control commands, comprising the steps of:

determining whether the present feed control command is a command to cut feed in a predetermined direction;

when the present feed control command is a command to cut feed in said predetermined direction, determining whether a predetermined distance feed in the reverse direction of said predetermined direction is commanded by the next feed control command;

when the present feed control command is a cut feed command in said predetermined direction and said next feed control command is a predetermine distance feed in the reverse direction of said predetermined direction, determining whether the command after said next feed control command is a cut feed command to cut feed in said predetermined direction;

when the command after said next feed control command is a cut feed command to cut feed in said predetermined direction, determining whether the predetermined distance feed commanded by the next feed control command is less than a predetermined distance at which said machine tool can be fed more rapidly by cut feed than rapid feed; and when said predetermined distance feed commanded by the next feed control command is less than said predetermined distance at which said machine tool can be fed more rapidly by cut feed than rapid feed, feeding said tool by cut feed rather than by rapid feed in response to said predetermined distance feed in the reverse direction of said predetermined direction.

3. A feed control method according to claim 2, wherein said present feed control command, said next feed control command and said command after said next feed control command constitute a pecking command sequence of said series of feed control commands.

4. A feed control method according to claim 2, wherein said next feed control command, when determined to be a predetermined distance feed command in the reverse direction of said predetermined direction, is changed to a cut feed command before execution so as to enable maximum cut feed speed.

* * * * *